United States Patent [19]

Gschwend et al.

[11] Patent Number: 4,921,381
[45] Date of Patent: May 1, 1990

[54] EXPANSION DOWEL ASSEMBLY AND METHOD OF ANCHORING THE ASSEMBLY

[75] Inventors: Peter Gschwend, Gamprin, Liechtenstein; Manfred Breuss, Feldkirch, Austria

[73] Assignee: Hilti Aktiengesellschaft, Fürstentum, Liechtenstein

[21] Appl. No.: 243,464

[22] Filed: Sep. 12, 1988

[30] Foreign Application Priority Data

Sep. 10, 1987 [DE] Fed. Rep. of Germany ....... 3730353

[51] Int. Cl.⁵ .............................................. F16B 13/04
[52] U.S. Cl. ......................................... 411/25; 411/32
[58] Field of Search ....................... 411/21, 22, 25–28, 411/32, 33, 55, 57, 60, 61

[56] References Cited

U.S. PATENT DOCUMENTS

| 710,534 | 10/1902 | Steward | 411/25 |
| 925,006 | 6/1909 | Mason | 411/25 |

FOREIGN PATENT DOCUMENTS 629095 12/1961 Italy ..................... 411/26

Primary Examiner—Neill R. Wilson

[57] ABSTRACT

An expansion dowel assembly includes an axially elongated expansion member, a first member for expanding the expansion member and a second member for anchoring the expansion member in a borehole before is is expanded by the first member. The second member can be connected to the expansion member or mounted in and in contact with the expansion member.

13 Claims, 3 Drawing Sheets

EXPANSION DOWEL ASSEMBLY AND METHOD OF ANCHORING THE ASSEMBLY

BACKGROUND OF THE INVENTION

The present invention is directed to an expansion dowel assembly and to a method of anchoring the assembly in a borehole. The assembly includes a radially expandable member with first means engageable with the expandable member for applying a load to the assembly. The first means is axially displaceable relative to the expandable member during the expanding operation.

Expansion dowel assemblies of the above-mentioned type have a after-expansion characteristic and, therefore, are used chiefly for medium and heavy load applications. During the after-expansion, the radial expansion of the expandable member and, as a result, the anchoring value of the expansion dowel assembly increases. To achieve expansion of the dowel assembly, the dowel assembly must be secured in the borehole against axial displacement.

In DE-OS 2 205 289 it is known to secure an expansion sleeve in a borehole by means of a cementing material. Such a solution, however, has various disadvantages. For example, the borehole must be carefully cleaned prior to the insertion of the dowel assembly so that the cemented anchorage can be developed. Furthermore, a cemented anchorage requires a certain time period to set or cure and during such period the dowel assembly can not be loaded.

SUMMARY OF THE INVENTION

Therefore, the primary object of the present invention is to provide an expansion dowel assembly and a method of anchoring the assembly to afford the immediate application of a load to the assembly.

In accordance with the present invention, the expandable member, such as an expansion sleeve, is mechanically anchored in the borehole by separate means prior to its expansion.

The anchorage of the expansion sleeve in the borehole allows the immediate application of a load to the assembly and reduces the requirement for any prior cleaning of the borehole. Since the separate means serve primarily to secure the expansion sleeve in the borehole, such means accept only a fraction of the load applied when a tensile or pulling force is placed on the dowel assembly. Accordingly, the separate means can be dimensioned for having less strength than the expansion sleeve.

In one preferred embodiment the separate means are formed as radially expandable segments. When such segments are expanded they contact the wall of the borehole and are anchored in a form-locking or friction-locking manner. The expandable segments can extend around the entire circumference or only for a part of the circumference of the assembly.

The expanded segments serve to fasten the expansion sleeve against axial displacement. Accordingly, the segments are connected with the expansion sleeve. Such connection can be effected by cementing, soldering or welding. Further, the segments and the expansion sleeve can engage one within the other in a form-locking manner.

The segments are expandable by means of the load application part of the assembly. Such expansion can be effected by driving a part of the load application member projecting out of the borehole into the hole or by axially displacing the load application member in the opposite direction, that is, by pulling it out of the borehole.

In another preferred arrangement the segments are expandable by the expansion sleeve. Such expansion can be achieved by axial displacement of the expansion sleeve opposite to the insertion direction into the borehole. By expanding the segments, the expansion sleeve is fixed in the axial direction whereby the sleeve itself is expanded when a tensile loading is applied to the load application member.

In another preferred arrangement the segments are expandable by an axially displaceable expanding element. Such an expanding element can be in the form of an expanding cone. The displacement of the expanding element is effected from outside the borehole by a placement pin or by using the load application member. A separate expanding element for the segments enables an optimum adaptation to the geometry of the segments.

Anchoring the segments against axial displacement can be achieved in a purely friction-locking manner. Since the necessary friction is dependent on the state of the borehole with respect to its cleaning and surface finish, the anchoring value of the segments can not be determined accurately in advance. Therefore, for an adequate anchorage of the segments, it is advantageous if the segments have profiled or shaped projection at their radially outer surfaces. During expansion of the segments, the projections are pressed into the borehole wall, affording a form-locking engagement between the segments and the wall of the borehole. Such an anchorage is independent, to a great extent, of the surface condition of the borehole and permits anchoring of the segments when tolerance deviations of the borehole diameter are present.

In yet another preferred embodiment, the separate means for anchoring the expansion sleeve can be :form-locking elements supported in through-openings in the expansion sleeve. Such form-locking elements can be pins, .balls or the like. Such form-locking elements are pressed against the surface of the borehole wall before the expansion sleeve is expanded.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
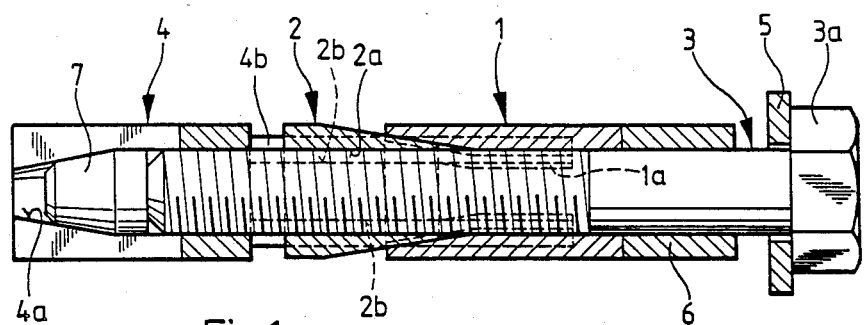
FIG. 1 is an axially extending sectional view of an expansion dowel assembly embodying the present invention taken along the line I—I in FIG. 3.
Figures 2, 3:
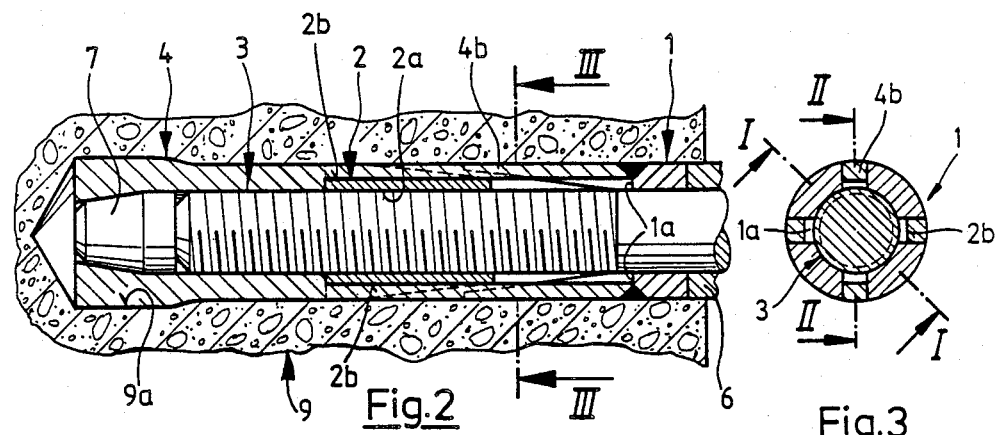
FIG. 2 is an axially extending sectional view of the expansion dowel assembly shown in FIG. 1 after the assembly has been anchored in a borehole with the section taken along the line II—II in FIG. 3.
FIG. 3 is a cross-sectional view of the expansion dowel assembly taken along the line III—III in FIG. 2.

In FIGS. 1 to 4 an expansion dowel assembly is illustrated made up of an axially extending expansion sleeve 1 and a tubular expansion cone 2 extending into the leading end of the expansion sleeve. As viewed in the drawing, the leading end of the different parts of the expansion dowel assembly are located to the left and the trailing ends to the right. The leading end is the end inserted first into the borehole 9a in the receiving material 9.

Expansion sleeve 1 has axially extending slots 1a extending from the leading end for facilitating radial expansion of the sleeve. Expansion cone 2 has an axially extending internal thread 2a and four axially extending grooves 2b equidistantly spaced around the circumference of the cone. Expansion cone 2 is in threaded connection with an axially extended threaded bolt 3 by means of its internal thread 2a. Threaded bolt 3 has a hexagonal head 3a at its trailing end. Expansion cone 2 and threaded bolt 3 form the load application means of the dowel assembly. A sleeve made up of radially expandable segments 4 is located on the leading end of the bolt 3 and the axial extending leading end portion of the segments 4 have an inner conically shaped surface 4a. The sleeve formed by the segments 4 is connected with the expansion sleeve by axially extending webs 4b extending from the trailing end of the segments through the grooves 2b in the expansion cone 2 to the expansion sleeve 1.

Figure 4:
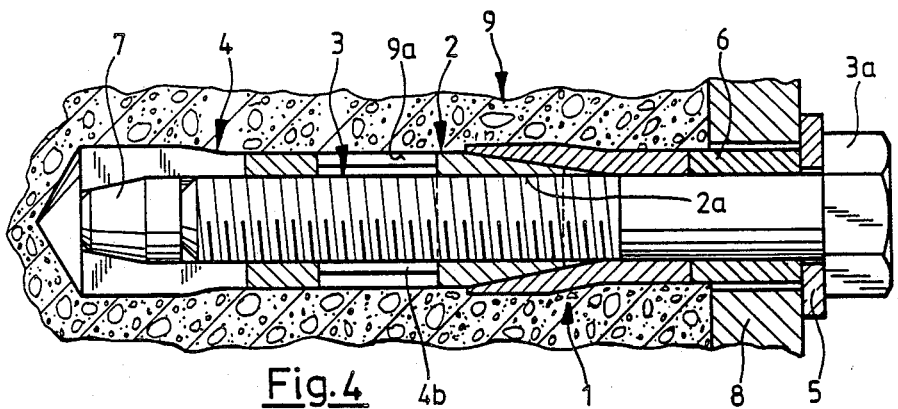
FIG. 4 is an axially extending sectional view of the expansion dowel assembly shown in FIG. 1 after the expansion sleeve has been anchored against axial displacement and then expanded.
Figure 5:
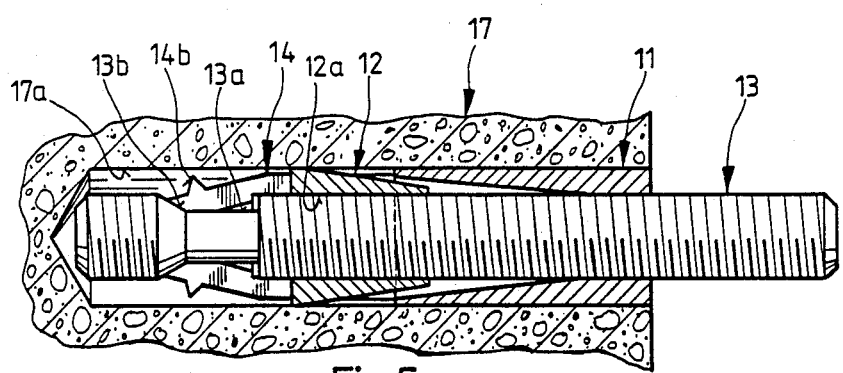
FIG. 5 is an axially extending view partly in section, of another embodiment of the expansion dowel assembly of the present invention with the assembly inserted into a borehole before the axial fastening of the expansion sleeve, with the view being taken along the line V—V in FIG. 7.

At the trailing end of the bolt 3 a washer 5 bears against the head 3a, note FIG. 1, and a spacer sleeve 6 is located between the washer and the trailing end of the expansion sleeve 1. An expanding member 7 is located at the leading end of the bolt 3 within the conically shaped surface 4a of the segments 4 for effecting the radial expansion of the segments. Expansion member 7 can be driven in the insertion direction of the assembly into the borehole into the position shown in FIGS. 2 and 4 by means of the threaded bolt 3. As the bolt is driven in, the expanding member 7 forces the segments 4 radially outwardly into the position shown in FIGS. 2 and 4 and anchors the sleeve formed by the segments in the borehole 9a of the receiving material 9. With the segments 4 anchored in the borehole, the expansion sleeve 1 is also secured against any axial displacement by the connection of the segments with the expansion sleeve by the webs 4b. Subsequently, by rotating the threaded bolt 3, the expansion cone 2 is pulled in the direction out of the borehole into the expansion sleeve 1, radially expanding the sleeve outwardly into anchored engagement with the borehole 9a in the receiving material 9 as indicated in FIG. 4. As the bolt 3 is turned for effecting the movement of the expansion cone 2 toward the trailing end of the expansion sleeve 1 the position of the expansion member 7 is not changed. As shown in FIG. 4, the expansion dowel assembly fastens a structural component part 8 to the surface of the receiving material 9. As the tensile loading of the expansion dowel assembly at the threaded bolt increases, the expansion cone 2 is drawn into the leading end of the expansion sleeve and effects an after-expansion of the sleeve 1.

In FIGS. 5 to 8 the expansion dowel assembly is formed by an axially extending expansion sleeve 11 and an axially extending hollow expansion cone 12 which extend into the leading end of the sleeve 11. Expansion sleeve 11 has axially extending slots 11a so that it can be expanded radially outwardly. Expansion cone 12 has an internal thread 12a and axially extending grooves 12b uniformly spaced about its circumference. Threaded bolt or stud 13 is screwed into engagement with and through the internal thread 12a and, in combination with the cone, forms the load application part of the dowel assembly. Adjacent its leading end, stud 13 has an axially extending necked-down portion 13a with a frusto-conical abutment surface 13b at the leading end of the portion 13a with the abutment spaced from the leading end of the stud by an axially extending threaded section. The necked-down portion 13a of the threaded stud 13 is located inwardly of axially extending finger-like segments 14 connected to the leading end of the expansion sleeve 11 by webs 14a which extend through the axially extending groove 12b in the outer circumferential surface of the cone 12. The segments 14 have a V-shaped projection 14b on the radially outer surface, that is, facing toward the wall surface of the borehole 17a in the receiving material 17.

Figures 6, 7:
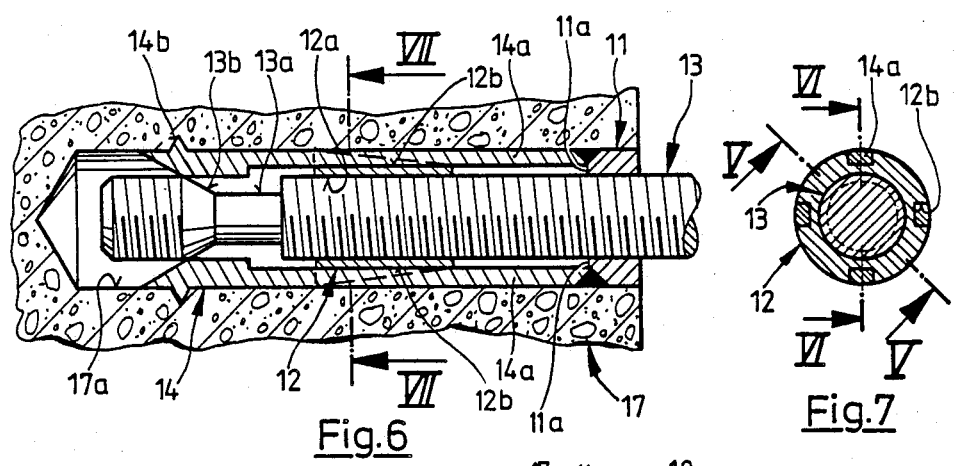
FIG. 6 is an axially extending view of the expansion dowel assembly shown in FIG. 5 after the expansion sleeve is secured against axial displacement, and taken along the line VI—VI in FIG. 7.
FIG. 7 is a cross-sectional view of the expansion dowel assembly taken along line VII—VII in FIG. 6.

In FIG. 6, the threaded stud 13 is displaced in the axial direction opposite to the insertion direction into the borehole, that is, it is moved in the direction of the borehole relative to the expansion sleeve 11. As a result, the abutment surface 13b displaces the segments 14 radially outwardly, compare FIG. 5 and FIG. 6, whereby the V-shaped projections 14b are pressed into the surface of the borehole 17a in the receiving material 17. While the segments 14 are pressed radially outwardly, no radial expansion of the expansion sleeve 11 is effected. With the segments pressed into engagement with the surface of the borehole 17a, the expansion sleeve is secured against axial displacement.

Figure 8:
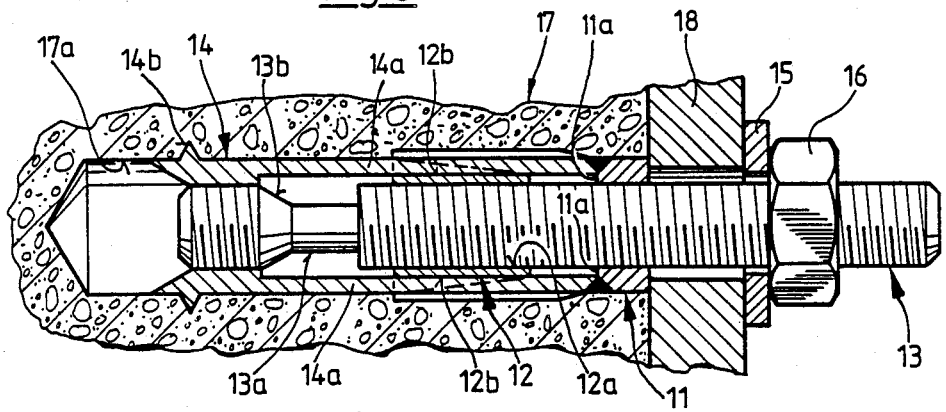
FIG. 8 is an axially extending sectional view through the expansion dowel assembly shown in FIGS. 5 and 6 after the expansion sleeve is anchored against axial displacement and is expanded.

In FIG. 8, threaded stud 13 is axially displaced further out of the borehole 17a moving axially relative to the expansion sleeve 11. Such displacement is effected by the direct application of a tensile or pulling force to the threaded stud 13 by turning a hexagon nut 16 around the stud while the nut is supported by a washer 15 against a structural component part 18 to be secured to the surface of the receiving material 17. As the stud 13 moves axially outwardly relative to the borehole, the expansion cone 12 is drawn into the leading end of the expansion sleeve 11 with the sleeve being radially expanded and anchored in the borehole 17a. During the expanding step, the expansion sleeve 11 is prevented from moving axially out of the borehole due to the anchorage afforded by the radially expanded segments 14.

Figure 9:
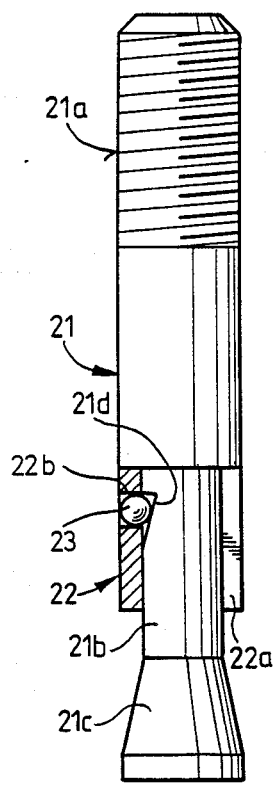
FIG. 9 is an axially extending view of another embodiment of the expansion dowel assembly of the present invention with the assembly shown in the unexpanded state.
Figure 10:
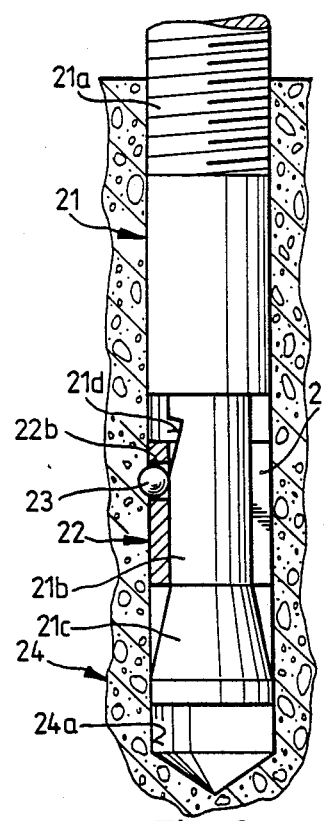
FIG. 10 is an axially extending view of the expansion dowel assembly displayed in FIG. 9 after the expansion sleeve has been anchored against axial displacement.
Figure 11:
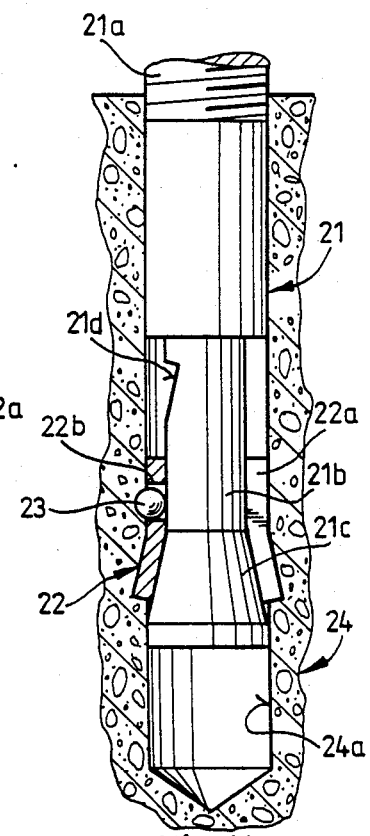
FIG. 11 is an axially extending view, partly in section, similar to FIG. 10, with the expansion dowel in the anchored and expanded state.

In FIGS. 9 to 11 another embodiment of the expansion dowel assembly is displayed and includes an axially extending anchor bolt 21 serving as a load application member with the bolt extending through an axially extending expansion sleeve 22 encircling an axially extending part of the bolt between its leading and trailing ends. Note in FIGS. 9 to 11 the leading end is the lower end. Extending from the trailing end of anchor bolt 21 is a thread 21a. For approximately half of its axial length from the trailing end the bolt 21 has a cylindrically shaped section of a greater diameter than a cylindrically shaped axially extending necked-down section 21b. Between the leading end of the necked-down section and the leading end of the anchor bolt there is an expansion cone which widens from the necked-down section to the leading end. In addition, at an intermediate point along its axial length, the necked-down section 21b has a recessed abutment ramp 21d. Expansion sleeve 22 has an axially extending slot 22a for facilitating radial expansion. A ball 23 is seated within the recess containing the abutment ramp 21d and extends from the ramp outwardly into the opening 22b in the expanded sleeve.

The insertion position of the expansion dowel assembly, that is the position of the assembly when it is inserted into a borehole, is shown in FIG. 9. In this position the ball 23 is supported on the abutment ramp 21d and is located within the opening 22b inwardly of the outside surface of the sleeve. As a result, the ball does not project outwardly beyond the outside surface of the expansion sleeve 22. If the assembly is inserted into a borehole 24a in a receiving material 24 as shown in FIG. 10, and the anchor bolt 21 is pulled through the sleeve with the cone 21c moving toward the leading end of the sleeve, the ball moves along the abutment ramp 21d and then into contact with the outside surface of the necked-down portion 21b so that the ball experiences a radially outward displacement. Accordingly, ball 23 is moved into the position shown in FIG. 10 projecting radially outwardly from the opening 22b in the sleeve 22 and provides a form-locking engagement with the wall or surface of the borehole 24a in the receiving material 24. As a result, the expansion sleeve 22 is secured in the receiving material 24 and is held against axial displacement. With continued axial displacement of the anchor bolt out of the borehole and relative to the expansion sleeve 22 into the position set forth in FIG. 11, the expansion sleeve is expanded radially outwardly by the expansion cone 21c at the leading end of the anchor bolt 21. Since the ball remains in contact with the outer surface of the necked-down portion 21d it does not move any further radially outwardly.

Figure 12:
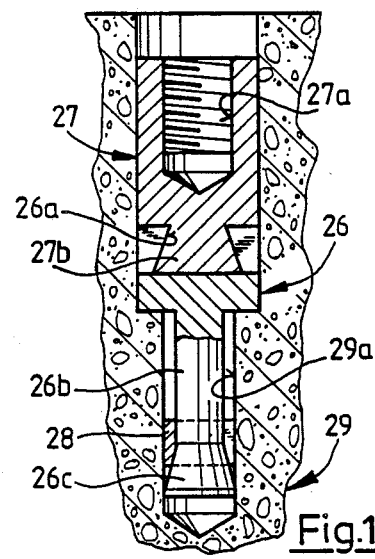
FIG. 12 is an axially extending sectional view of another embodiment of the expansion dowel assembly of the present invention inserted into a borehole and prior to being anchored and expanded.
Figure 13:
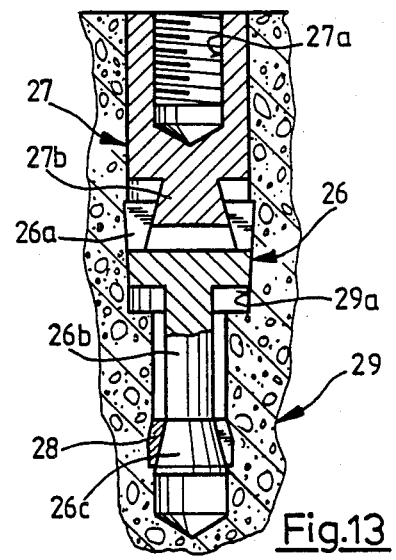
FIG. 13 is a view similar to FIG. 12 with the expansion dowel assembly set forth in the anchored and expanded state.

Yet another embodiment of the expansion dowel assembly is exhibited in FIGS. 12 and 13 and includes an expansion sleeve member 26 and a load application part 27. Load application part 27 has an axially extending blind bore extending from its trailing end toward its leading end and the blind bore has an internal thread 27a. At its leading end, the part 27 has an axially extending reduced diameter section forming a cone section 27b with the outer surface of the cone diverging toward the leading end, that is in the direction in which the assembly is inserted into borehole 29a in the receiving material 29. The expansion sleeve member 26 has a sleeve section 26a at its trailing end and the sleeve section forms a blind borehole which narrows conically toward the trailing end of the sleeve member. An axially extending trailing end section of the sleeve member 26 has the same diameter as the main section of the part 27 and ahead of this larger diameter section is a reduced diameter axially extending shaft 26b with a conically shaped expansion body 26c at the leading end of the shaft with the expansion body diverging in the insertion direction into the borehole. An axially extending annular segment member 28 encircles the leading end of the shaft 26b and the trailing part of the expansion body 26c. The segment member 28 is slit in the axial direction. The expansion dowel assembly is used in a stepped borehole 29a drilled to receive the different diameter sections of the load application part 27 and the expansion sleeve member 26. In FIG. 12 the expansion dowel assembly has been inserted into the borehole 29a in the receiving material 29, however, no expansion of the dowel has been effected. As can be seen in FIG. 12 the expansion cone section 27b of the part 27 fits within the sleeve section 26a of the sleeve member 26. In cross-section in FIG. 12, the cone section 27b and the opening formed by the sleeve section 26a have a dovetailed cross-sectional appearance.

When the load application part 27 is pulled out of the borehole, that is, in the direction opposite to the insertion direction of the assembly into the borehole, the expansion sleeve member 26 is initially carried along by the interengagement between the expansion cone section 27b and the opening formed by the sleeve section 26a. During the initial displacement of the load application part 27, the segment member 28 in contact with the surface of the reduced diameter part of the borehole 29 is radially expanded, note FIG. 13. As a result, expansion sleeve member 26 is secured within the borehole 29a against any axial displacement. By continuing to apply a tensile or pulling force to the load application part 27, a relative axial displacement of the part 27 takes place with respect to the expansion sleeve 26. Accordingly, the sleeve section 26a at the trailing end of the expansion sleeve member is expanded radially outwardly within the larger diameter section of the borehole 29a. The resulting anchoring value of the dowel assembly is based on the sum of the expansion of the segment member 28 and of the sleeve section 26. Subsequent expansion of the dowel assembly is ensured by anchoring the expansion sleeve member 26 in the borehole 29a effected beforehand. As can be seen in FIGS. 12 and 13 the expansion sleeve section 26a of the sleeve member 26 is divided by slits to assist in the radial expansion of the sleeve section.

While specific embodiments of the invention have been shown and described in detail to illustrate the application of the inventive principles, it will be understood that the invention may be embodied otherwise without departing from such principles.

We claim:

1. An expansion dowel assembly for insertion into a borehole formed in a receiving material comprising an axially extending radially expandable member, axially extending first means substantially coaxial and engageable with said expandable member and being axially displaceable relative thereof, said first means arranged for attaching a load thereto for applying the load to said dowel assembly, second means in contact with said expandable member and radially outwardly displaceable by the axial displacement of said first means for securing said expandable member in the borehole prior to radial expansion of said expandable member, said expandable member has a leading end and a trailing end with the leading end inserted first into a borehole, the trailing end of said expandable member has an axially extending sleeve section slotted in the axial direction for facilitating radial expansion, said sleeve section having an axially extending radially inner conical surface converging toward the trailing end, said first means comprises a load engagement part having a leading end and a trailing end with the leading end thereof being formed monolithically with said load engagement part and having an axially extending radially outer conical surface diverging toward the leading end and engageable within said sleeve member in axially displaceable surface contact with the inner conical surface of said sleeve member, and said second means comprises an expansion sleeve engageable with said expandable member between the leading end thereof and said sleeve member.

2. An expansion dowel assembly, as set forth in claim 1, wherein said expandable member has an axially extending conically shaped section engageable with said expansion sleeve for radially expanding said expansion sleeve.

3. An expansion dowel assembly for insertion into a borehole formed in a receiving material comprising an axially extending radially expandable member, axially extending first means substantially coaxial and engageable with said expandable member and being axially displaceable relative thereof, said first means arranged for attaching a load thereto for applying the load to said dowel assembly, second means in contact with said expandable member and radially outwardly displaceable by the axial displacement of said first means for securing said expandable member in the borehole prior to radial expansion of said expandable member, said second means is an axially extending member having radially expandable segments, said second means comprises an axially extending sleeve having a leading end and a trailing end, said segments connected to and extending axially outwardly from the leading end of said sleeve and connecting webs secured to the trailing end of said sleeve and being connected to said expandable member.

4. An expansion dowel assembly, as set forth in claim 3, wherein said expandable member comprises an axially extending sleeve.

5. An expansion dowel assembly, as set forth in claim 3, wherein said segments comprise axially extending finger-like segments connected to said expandable member, said segments having a radially outer surface, a projection formed on and extending radially outwardly from the outer surface of said segments, and said projection being shaped to effect a gripping action with the surface of the borehole when said segments are expanded radially outwardly.

6. An expansion dowel assembly, as set forth in claim 5, wherein said projections are V-shaped with the apex of the V-shape located radially outwardly from said segments.

7. An expansion dowel assembly, as set forth in claim 3, wherein said second means includes connecting means connecting said segments to said expandable member.

8. An expansion dowel assembly, as set forth in claim 7, wherein said segments are in engagement with and are expandable by said first means.

9. An expansion dowel assembly, as set forth in claim 8, wherein said first means comprises an axially extending bolt insertable through said expandable member and an expanding member located at the end of the bolt to be inserted first into a borehole and said expanding member arranged to expand said segments of said second means.

10. An expansion dowel assembly, as set forth in claim 9, wherein said expanding member is formed as a separate member from said bolt.

11. An expansion dowel assembly, as set forth in claim 9, wherein said expanding member is formed integrally with said bolt.

12. An expansion dowel assembly for insertion into a borehole formed in a receiving material comprising an axially extending radially expandable member, axially extending first means substantially coaxial and engageable with said expandable member and being axially displaceable relative thereof, said first means arranged for attaching a load thereto for applying the load to said dowel assembly, second means in contact with said expandable member and radially outwardly displaceable by the axial displacement of said first means for securing said expandable member in the borehole prior to radial expansion of said expandable member, said expandable member comprises an axially extending expansion sleeve having a leading end and a trailing end relative to the direction in which the assembly is inserted into a borehole, said sleeve having an inside surface and an outside surface with an opening extending therethrough from the inside surface to the outside surface, and said second means comprises a locking element supported in said opening in said sleeve.

13. An expansion dowel assembly, as set forth in claim 12, wherein said first means comprises an axially extending bolt-like element extending through said sleeve and said bolt-like element having an abutment surface thereon arranged to engage said locking element in said opening in said sleeve so that with axial displacement of said bolt-like member said locking element is displaced radially outwardly through said opening in said sleeve into locking engagement with the surface of the borehole into which the expansion dowel assembly is inserted.

* * * * *